United States Patent Office 3,138,615
Patented June 23, 1964

3,138,615
NOVEL BICYCLO[2.2.2]OCT 7-ENE TETRA-
CARBOXYLIC DIIMIDES
Henry Bluestone, University Heights, Ohio, assignor to
Diamond Alkali Company, Cleveland, Ohio, a corporation of Delaware
No Drawing. Filed Feb. 11, 1960, Ser. No. 7,981
12 Claims. (Cl. 260—326)

This invention relates to a novel class of biologically active compounds and to methods for the preparation and use of such compounds.

More specifically, the compounds of the present invention are pesticides having the following generic formula:

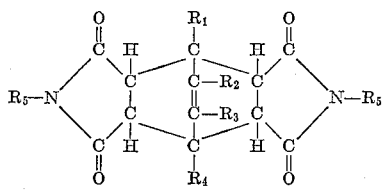

wherein $R_1$ through $R_4$ are selected from the group consisting of hydrogen atoms, halogen atoms, aryl, alkyl, aralkyl, and substituted aryl radicals, and $R_5$ is selected from the group consisting of aryl, alkyl, aralkyl, and substituted aryl radicals.

Exemplary of specific compounds falling within the above generic formula are the following:

(I)
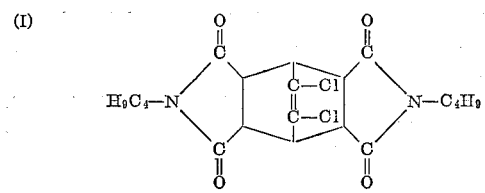

N,N'-dibutyl-7,8-dichlorobicyclo-[2.2.2]oct-7-ene
2,3,5,6-tetracarboxylic diimide (II)
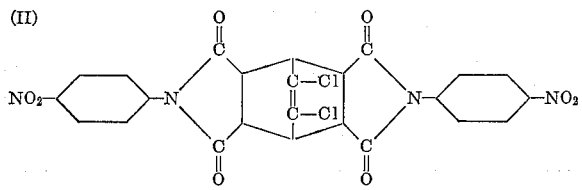

7,8-dichloro-N,N'-bis(p-nitrophenyl)bicyclo-[2.2.2]oct-
7-ene-2,3,5,6-tetracarboxylic diimide (III)
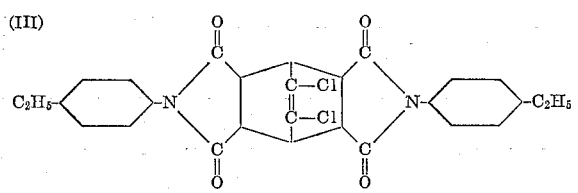

7,8-dichloro-N,N'-bis(p-ethylphenyl)bicyclo-[2.2.2]oct-
7-ene-2,3,5,6-tetracarboxylic diimide (IV)
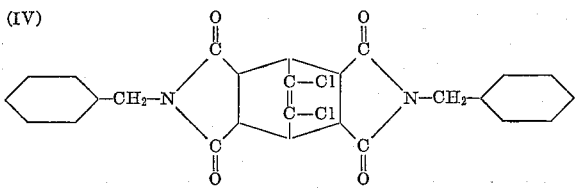

7,8-dichloro-N,N'-dibenzylbicycli-[2.2.2]oct-7-ene-
2,3,5,6-tetracarboxylic diimide (V)
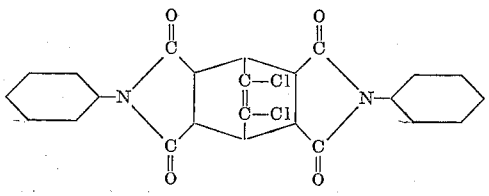

7,8-dichloro-N,N'-diphenylbicyclo-[2.2.2]oct-7-ene-
2,3,5,6-tetracarboxylic diimide (VI)
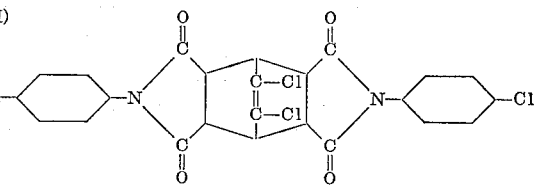

7,8-dichloro-N,N'-bis(p-chlorophenyl)bicyclo-[2.2.2]oct-
7-ene-2,3,5,6-tetracarboxylic diimide (VII)
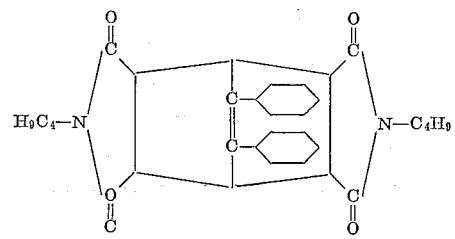

N,N'-dibutyl-7,8-diphenylbicyclo-[2.2.2]oct-7-ene-
2,3,5,6-tetracarboxylic diimide (VIII)
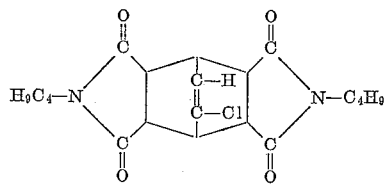

N,N'-dibutyl-7-chlorobicyclo-[2.2.2]oct-7-ene-2,3,5,6-
tetracarboxylic diimide

It is to be understood, that as used hereinafter, the term "pesticide" or "pesticidal composition" is meant to refer to those toxicant compositions which are effective in killing or controlling the growth of plants, insects, nematodes, microorganisms, fungi, bacteria and the like, and it is intended to refer broadly to those compositions commonly known as insecticides, bactericides, fungicides, nematocides, herbicides and the like.

Moreover, while the novel compounds of this invention may be employed in a variety of applications, biologically active or otherwise, it will be understood, of course, that such compounds may be utilized in diverse formulations, both liquid and solid, including finely-divided powders and granular materials, as well as liquids, such as solutions, concentrates, emulsifiable concentrates, slurries and the like, depending upon the application intended and the formulation media desired.

These compounds may be used alone or in combination with other known biologically-active materials so as to give a composition which is effective against a variety of pests.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents or the like, including water and various organic liquids, such as benzene, toluene, chlorinated benzene, acetone, cyclohexanone, xylene, carbon disulfide and various mixtures thereof.

When liquid formulations are employed, or dry materials prepared which are to be used in liquid form, it may be desirable to employ a wetting, emulsifying or dispersing agent to facilitate the use of the formulation, e.g., Triton X–155 (alkyl aryl polyether alcohol, U.S. Patent 2,504,064).

The term "carrier" as employed in the specification and claims is intended to refer broadly to materials constituting a major proportion of a biologically-active or other formulation, and hence includes finely-divided materials, both liquids and solids, as aforementioned, conveniently used in such applications.

It is to be further understood, that the term "halogen" as used hereinafter in the specification and claims, is intended to refer to fluorine, chlorine, bromine, and iodine. However, because of its low cost and ready availability, the preferred halogen is chlorine, and for this reason, primary reference hereinafter will be made thereto.

In general, the compounds of the present invention may be prepared by reacting a thiophene 1,1-dioxide and an N-substituted maleimide.

More specifically, a compound having the structure

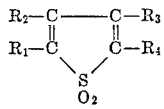

is reacted with a compound having the structure

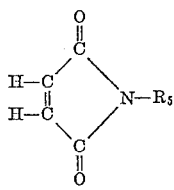

to form the compounds of the present invention, falling within the generic formula

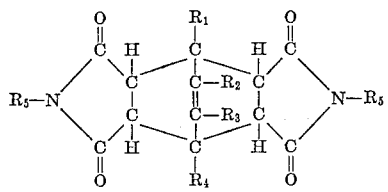

wherein $R_1$ through $R_4$ are selected from the group consisting of hydrogen atoms, halogen atoms, aryl, alkyl, aralkyl, and substituted aryl radicals, and $R_5$ is selected from the group consisting of aryl, alkyl, aralkyl, and substituted aryl radicals.

Exemplary of the N-substituted maleimides which may be so reacted are the following: N-butylmaleimide, N-(p-nitrophenyl)maleimide, N-(p-ethylphenyl)maleimide, N-benzylmaleimide, N-phenylmaleimide, and N-(p-chlorophenyl)maleimide. The preferred thiophene 1,1-dioxide for reaction with the N-substituted maleimides is 3,4-dichlorothiophene 1,1-dioxide, although others may be used.

The above reactants are combined in an inert solvent, such as methanol, benzene, xylene, chloroform, or the like, and, if necessary, heated for a period of time sufficient to effect a Diels-Alder type reaction. The resulting product is collected and purified, generally by recrystallization from a suitable solvent, such as methanol or chloroform.

In order that those skilled in the art may better understand the method of the present invention and the manner in which it may be practiced, the following specific examples are given. In these examples, the 3,4-dichlorothiophene 1,1-dioxide is prepared according to the procedure set forth in U.S. patent application Serial No. 709,449, now U.S. Patent No. 2,976,297, issued March 21, 1961. Moreover, the 3,3,4,4-tetrachlorotetrahydrothiophene 1,1-dioxide referred to in this preparation is prepared according to the method set forth in U.S. patent application Serial No. 645,676, now U.S. Patent No. 2,957,887, issued October 25, 1960.

EXAMPLE 1

*Preparation of N,N'-Dibutyl-7,8-Dichlorobicyclo-[2.2.2] Oct-7-Ene-2,3,5,6-Tetracarboxylic Diimide (I)*

A solution of 9.3 g. (0.05 mole) of 3,4-dichlorothiophene 1,1-dioxide in 200 ml. of xylene is added to 15 g. (0.98 mole) of N-butylmaleimide and heated at reflux temperature for 2½ hours, then left at room temperature overnight. The solid which forms is filtered off and the filtrate is partially evaporated, increasing the amount of solid to 18.2 g. (87%), M.P. 250°–252° C. This is recrystallized once from 700 ml. of xylene, including a decolorizing treatment, and twice from 1400 ml. portions of methanol, producing 11.8 g. (56%) white tetragonal plates of (I), M.P. 257.5°–258.5° C., having the following analysis:

| Element | Calculated percent by weight | Actual, percent by weight |
|---|---|---|
| Cl | 16.5 | 16.4 |
| N | 6.5 | 6.4 |
| S | absent | absent |

EXAMPLE 2

*Preparation of 7,8 - Dichloro - N,N'-Bis(p - Nitrophenyl) Bicyclo - [2.2.2]Oct - 7 - Ene - 2,3,5,6 - Tetracarboxylic Diimide (II)*

A solution of 18.5 g. (0.1 mole) of 3,4-dichlorothiophene 1,1-dioxide and 43.6 g. (0.2 mole) of N-(p-nitrophenyl) maleimide in 1100 ml. of benzene is stirred at reflux temperature overnight. An additional 9.3 g. (0.05 mole) of 3,4-dichlorothiophene 1,1-dioxide is then added and stirring at reflux is continued for another 4½ hours. Filtering the hot reaction mixture removes 49 g. of purple powder. Soluble impurities are removed by extracting this solid with chloroform, leaving 45.2 g. (81%) light purple (II). A portion of this is recrystallized twice from dimethylformamide, producing white crystals which darkened above 440° C., but do not melt below 500° C., and which have the following analysis:

| Element | Calculated percent by weight | Actual, percent by weight |
|---|---|---|
| C | 51.8 | 52.0 |
| H | 2.53 | 2.7 |
| Cl | 12.7 | 12.7 |
| S | absent | absent |

EXAMPLE 3

Male German cockroaches, *Blattella germanica*, 8 to 9 weeks old, are anaesthetized with carbon dioxide to facilitate handling and then dipped in a test formulation (2000 p.p.m. product of Example 1-5% acetone-0.01% Triton X–155-balance water) for 10 seconds, removed, and freed of excess liquid, and caged. Two lots of 10 insects each are exposed to this formulation and mortality and observations are recorded after three days. Using the product of Example 1 at the above concentration, significant mortality of the cockroaches is observed.

EXAMPLE 4

The following test measures the ability of the product of Example 1 to protect pea seed and seedlings from seed decay and damping-off fungi (Pythium and Fusarium). In this test infested soil in 4 x 4 x 3 inch plant band boxes is treated by a soil drench-mix method at the equivalent rate of 128 lbs./acre. Treatment is accomplished by pouring 70 ml. of a 2000 p.p.m. test formulation (2000 p.p.m. product of Example 1-5% acetone-0.01% Triton X-155) on the surface of the soil. This is allowed to stand until the next day when the soil is removed from each box and thoroughly mixed before being replaced in the box. Three days after treatment, 25 pea seeds, variety Perfection, are planted to a uniform depth in each box. Untreated checks are included in each test in addition to a check planted in sterilized soil. Observations made 14 days after planting show a significantly higher percentage stand in those materials treated with the compound of Example 1 as compared to the untreated checks.

EXAMPLE 5

The procedure of Example 4 is repeated using as the test chemical the product of Example 2. Observations made 14 days after planting show that the product of Example 2 is substantially equivalent to the product of Example 1 in protecting pea seed and seedlings from seed decay and damping-off fungi.

EXAMPLE 6

To evaluate bactercidal activity, the compound of Example 2 is mixed at a concentration of 250 p.p.m. with distilled water containing 5% acetone and 0.01% Triton X-155. Two ml. of the test formulation are put in each of two test tubes. To each test tube is added 0.5 ml. of culture broth of different test organisms. The following plant pathogens are used: *Erwenia amylovora* and *Xanthomonas phaseoli*. The tubes are then incubated for 24 hours at 37° C. Transfers are then made to sterile broth with a standard 4 mm. loop and incubated for 48 hours at 37° C. after which growth of the organisms is observed. Using this procedure, the product of Example 2 shows significant inhibition of the growth of the test organisms.

While there have been described various embodiments of the invention, the methods and products described are not intended to be understood as limiting the scope of the invention, as it is realized that changes therewithin are possible, and it is further intended that each element recited in any of the following claims is to be understood as referring to all equivalent elements for accomplishing substantially the same results, in substantially the same or equivalent manner, it being intended to cover the invention in whatever form its principle may be utilized.

What is claimed is:

1. A compound of the formula

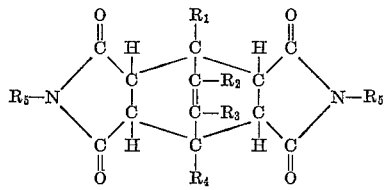

wherein
$R_1$ through $R_4$ are selected from the group consisting of hydrogen, chlorine, lower alkyl, benzyl, phenyl, nitrophenyl, chlorophenyl and lower alkyl phenyl; and
$R_5$ is selected from the group consisting of lower alkyl, benzyl, phenyl, nitrophenyl, chlorophenyl and lower alkyl phenyl.

2. N,N' - dibutyl - 7,8 - dichlorobicyclo-[2.2.2]oct-7-ene-2,3,5,6-tetracarboxylic diimide.
3. 7,8 - dichloro - N,N'-(p-nitrophenyl)bicyclo-[2.2.2] oct-7-ene-2,3,5,6-tetracarboxylic diimide.
4. 7,8 - dichloro - N,N' - bis(p-ethylphenyl)bicyclo-[2.2.2]oct-7-ene-2,3,5,6-tetracarboxylic diimide.
5. 7,8 - dichloro - N,N' - dibenzylbicyclo-[2.2.2]oct-7-ene-2,3,5,6-tetracarboxylic diimide.
6. 7,8 - dichloro - N,N' - diphenylbicyclo-[2.2.2]oct-7-ene-2,3,5,6-tetracarboxylic diimide.
7. 7,8 - dichloro - N,N' - bis(p-chlorophenyl)bicyclo-[2.2.2]oct-7-ene-2,3,5,6-tetracarboxylic diimide.
8. N,N' - dibutyl - 7,8 - diphenylbicyclo - [2.2.2]oct-7-ene-2,3,5,6-tetracarboxylic diimide.
9. N,N' - dibutyl - 7 - chlorobicyclo-[2.2.2]oct-7-ene-2,3,5,6-tetracarboxylic diimide.
10. A method of preparing a compound of the structure

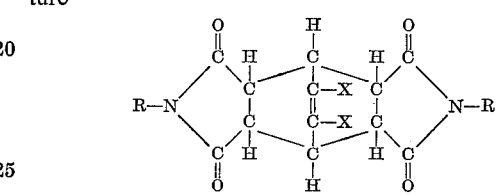

which comprises reacting a compound of the structure

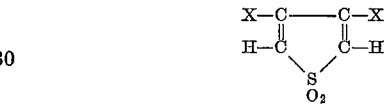

and a compound having the structure

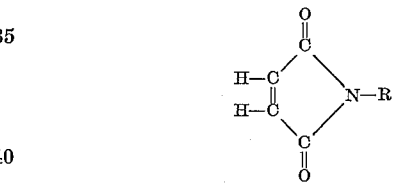

wherein X is chlorine and R is selected from the group consisting of lower alkyl, benzyl, phenyl, nitrophenyl, chlorophenyl and lower alkyl substituted phenyl at the reflux temperature of the reaction mixture and separating the desired product by filtration.

11. The method of preparing N,N'-dibutyl-7,8-dichlorobicyclo-[2.2.2]oct-7-ene-2,3,5,6-tetracarboxylic diimide which comprises reacting 3,4-dichlorothiophene 1,1-dioxide and N-butylmaleimide at the reflux temperature of the reaction mixture and separating resulting product by filtration.

12. The method of preparing 7,8-dichloro-N,N'-bis(p-nitrophenyl)bicyclo-[2.2.2]oct-7 - ene-2,3,5,6 - tetracarboxylic diimide which comprises reacting 3,4-dichlorothiophene 1,1-dioxide and N-(p-nitrophenyl)maleimide at the reflux temperature of the reaction mixture and filtering off the resulting product.

References Cited in the file of this patent
UNITED STATES PATENTS

| | | |
|---|---|---|
| 2,665,234 | Goodhue et al. | Jan. 5, 1954 |
| 2,740,744 | Abramitis et al. | Apr. 3, 1956 |
| 2,861,919 | Gilbert | Nov. 25, 1958 |
| 2,875,123 | Gaertner et al. | Feb. 24, 1959 |
| 2,904,553 | Sasse et al. | Sept. 15, 1959 |
| 2,904,554 | Wheeler et al. | Sept. 15, 1959 |